March 20, 1934.  H. A. WHEELER  1,951,685
PEAK DETECTOR
Filed April 1, 1931   4 Sheets-Sheet 1
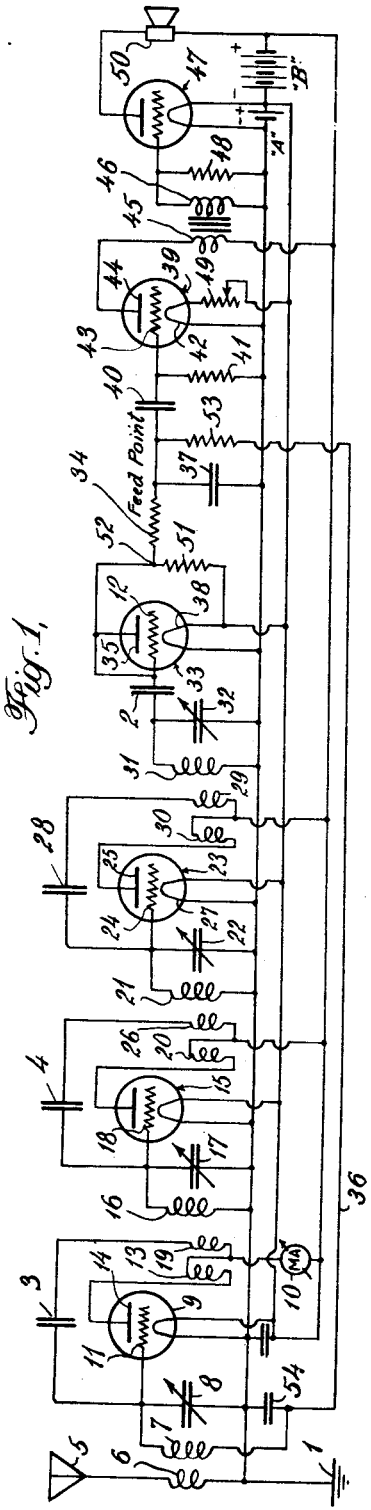
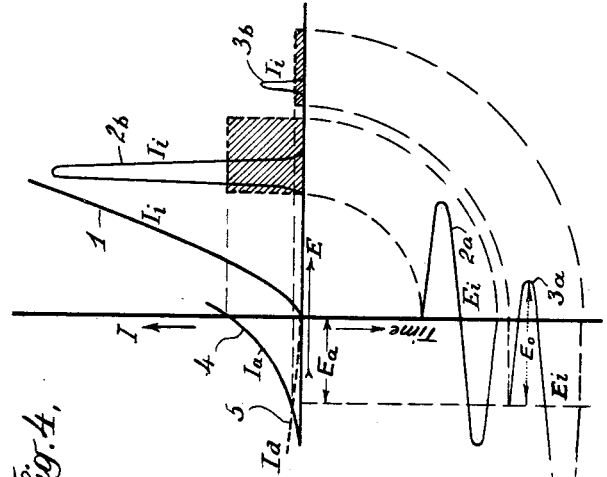
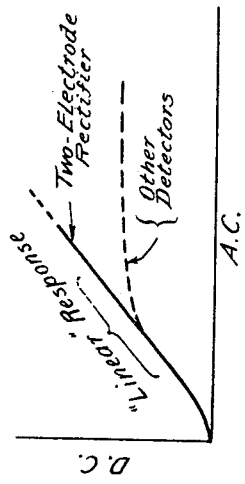
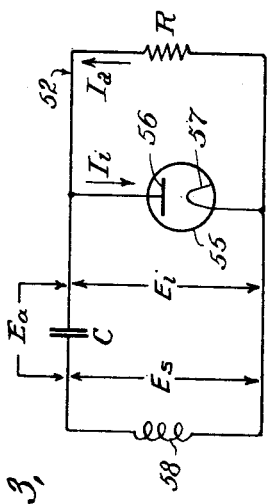
INVENTOR
HAROLD A. WHEELER
BY
Pennie, Davis, Marvin and Edmonds
ATTORNEYS

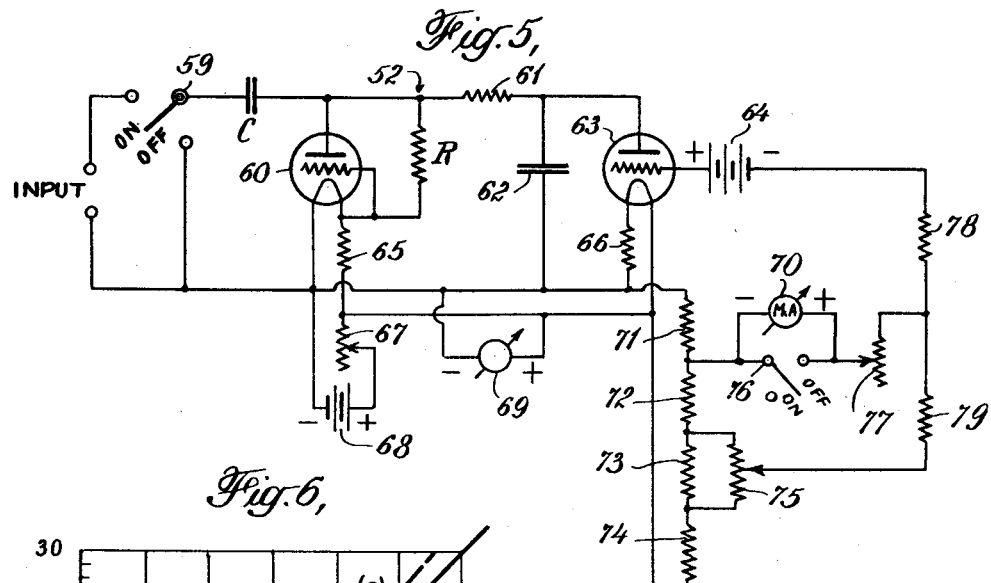
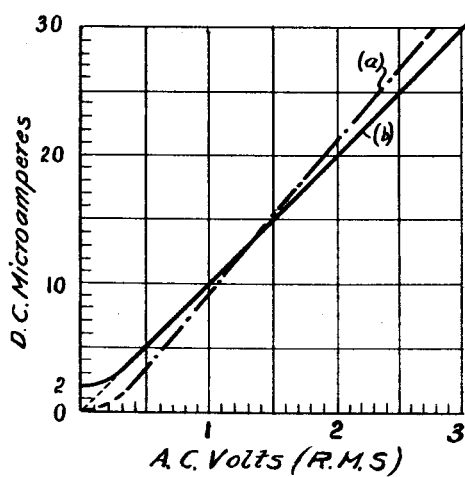
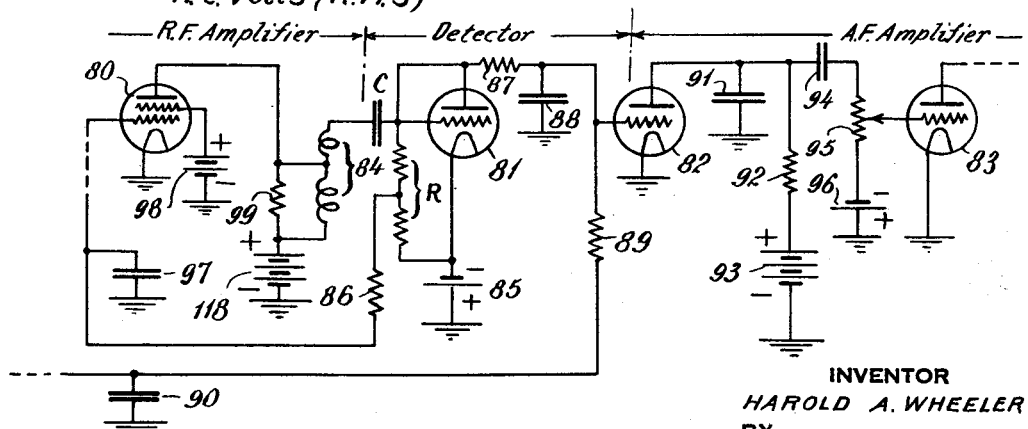

INVENTOR
HAROLD A. WHEELER
BY
ATTORNEYS

March 20, 1934.  H. A. WHEELER  1,951,685
PEAK DETECTOR
Filed April 1, 1931    4 Sheets-Sheet 4
Fig. 10a,
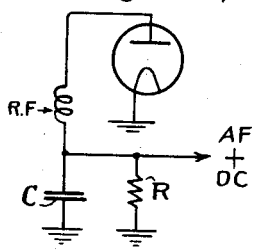
Fig. 10b,
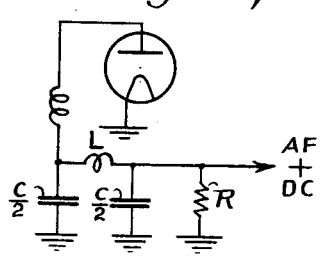
Fig. 10c,
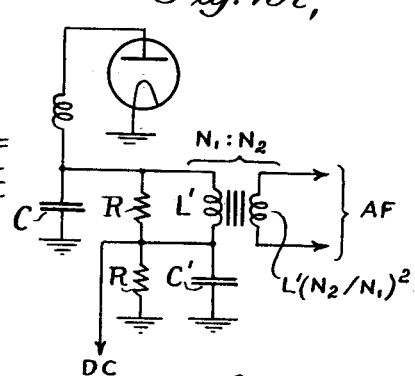
Fig. 10d,
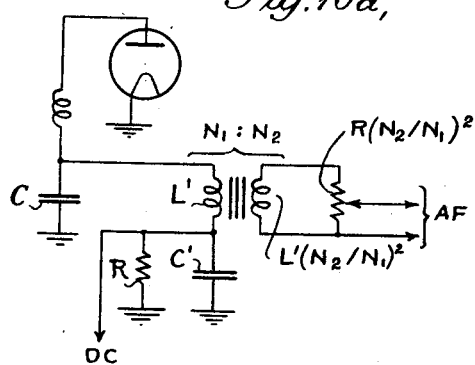
Fig. 10e,
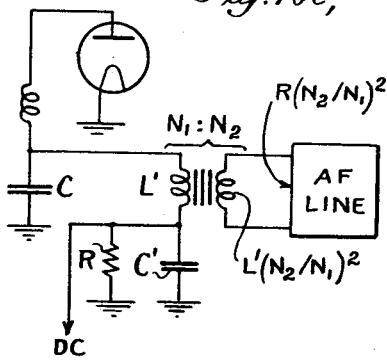
Fig. 10f,
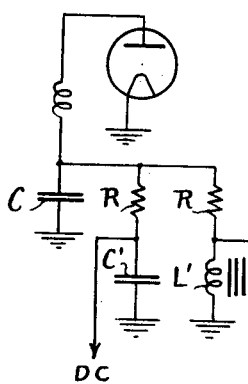
Fig. 10g,
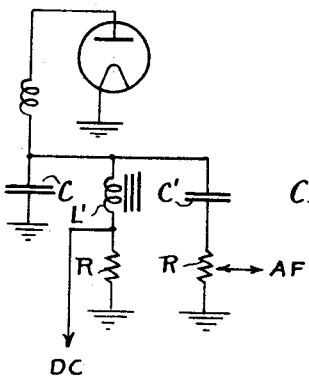
Fig. 10h,
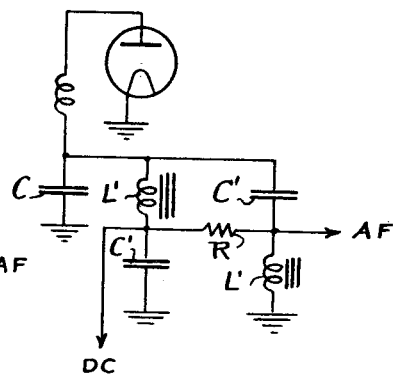
INVENTOR
HAROLD A. WHEELER
BY
Pennie, Davis, Marvin and Edmonds
ATTORNEYS Patented Mar. 20, 1934

1,951,685

UNITED STATES PATENT OFFICE 1,951,685

PEAK DETECTOR

Harold A. Wheeler, Great Neck, N. Y., assignor to Hazeltine Corporation, a corporation of Delaware Application April 1, 1931, Serial No. 526,857
In Great Britain July 3, 1928

8 Claims. (Cl. 250—27)

This invention relates to signal detection and more particularly to rectifying or detecting arrangements adapted to rectify radio or carrier wave signals.

This application is a continuation in part of my copending application Serial No. 203,879, filed July 7th, 1927.

The detectors contemplated herein are of a type in which the rectified response is directly proportional to the amplitude of the applied carrier wave.

In its broadest aspect, the invention comprises a rectifying element having in series therewith a capacity across which a modulation or audio-frequency component is developed, and having in shunt therewith a high impedance through which the direct current component of the rectified response flows.

A feature of the operation of detectors of the type of this invention is that the rectifying action is effected by the peaks of the signal waves; hence they will be referred to as "peak" detectors.

Advantages derived from the use of such detecting devices are:

(1) The substantially direct proportionality or "linear" relation, between the signal voltage and the direct current component of the rectified voltage or current;

(2) The undistorted reproduction in the rectified output of the envelope of a modulated carrier signal input;

(3) The absence of undesirable overload limitations;

(4) The simplicity of operation, requiring no polarizing voltages; and (5) Improved circuit arrangements by means of which the detector is made to respond alike to rapidly and slowly modulated carrier waves.

Detecting devices characterized by the above noted advantages are particularly well-adapted for detecting the signals at the output of a carrier-frequency amplifier which is provided with an automatic amplification regulating arrangement for maintaining substantially constant signal strength at the amplifier output. Such a combination of a carrier-frequency amplifier, a "linear" type detector and an automatic volume controlling arrangement is described in my said copending original application Serial No. 203,879, and is claimed in my United States Letters Patent No. 1,879,863 which is a division of my said application Serial No. 203,879.

By virtue of the use of a linear type detector, the carrier wave can be maintained at a substantially constant level at the output of the amplifier, and the modulation or audio-frequency, component of the rectified response has the same wave form as the modulation component of the applied carrier signal.

While some of the present improvements are applicable to detectors having three or more electrodes, the invention will be described with reference to the diode detector, which has the merit of simplicity.

An important application of the invention is a vacuum tube voltmeter which comprises a "peak" detector, a direct current amplifier and a current responsive indicator which may be calibrated to measure directly the voltage applied to the voltmeter. This arrangement will be hereinafter described in detail.

An important feature of the invention is a filtering system associated with the rectifier and so arranged that the direct current component and modulation current component of the rectified response may be separated, while at the same time, the load impedance applied to the rectifier is substantially the same for both of said rectified components.

Another feature of the invention is the use as a diode of a vacuum tube having more than two electrodes. In one of these arrangements a pair of inner electrodes are utilized as the electrodes of the diode and an outer electrode is used as a shield between the inner electrodes and the surrounding space.

Fig. 1 is a circuit diagram of a complete radio receiver which includes parts of the present invention, and comprises a three-stage radio-frequency amplifier followed by a rectifier, a two-stage audio-frequency amplifier, and a loud speaker or other suitable indicating device;

Fig. 2 shows graphically a comparison between the performance of the two-electrode valve or rectifier, and that of the ordinary three-electrode detector;

Fig. 3 is a fragmentary diagram of the detector of Fig. 1.

Fig. 4 shows graphically the behavior of the diode detector of the type of this invention;

Fig. 5 is a circuit diagram of a vacuum-tube voltmeter comprising a diode detector and a direct current amplifier;

Fig. 6 shows the calibration curves of the voltmeter of Fig. 5;

Fig. 7 is a partial circuit diagram of a radio receiver having a diode detector which receives the output of an auto-transformer-coupled untuned radio-frequency amplifier stage;

Figs. 10a to 10h are fragmentary diagrams of detectors showing various types of output networks which are equivalent to a pure resistance load insofar as audio-frequency and direct current reactions are concerned.

Figure 8:
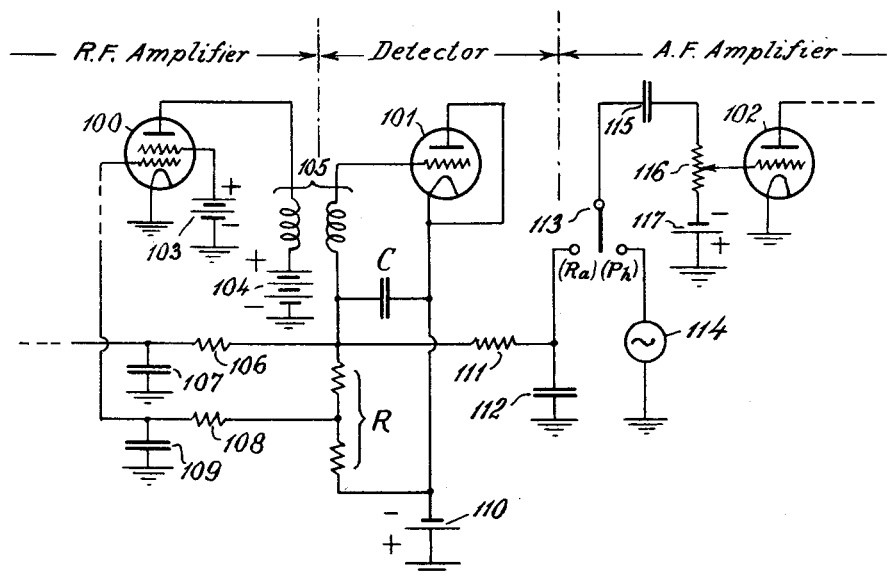
Fig. 8 is a partial circuit diagram of a radio receiver having a diode detector which receives the output of a transformer-coupled untuned radio-frequency amplifier stage.

It may be here noted that throughout the present specification and claims the terms "rectifier" and "detector" are, in general, used interchangeably, the terms "rectifying" and "converting" being employed in the general sense to include the process of changing alternating current into a form of direct current or pulsating unidirectional current. No distinction is made between batteries and other power supply devices, which, it it well understood, can be used with substantially identical results. It is also well known that vacuum-tube cathodes may be directly heated filaments or indirectly heated cathodes, with similar results.

Referring in detail to Fig. 1, there is shown an antenna 5 connected to ground 1 through the primary winding 6 of a radio-frequency transformer, the secondary winding 7 of which, tuned by a variable condenser 8, is connected at one point to the filament of the vacuum tube 9 in the first radio-frequency amplifying stage and at another point to the grid 11 of this vacuum tube. The output circuit of this vacuum tube extends from the filament system, through a high-voltage battery "B", a milliammeter 10, primary winding 13 of a second radio-frequency transformer to the anode or plate 14 of this vacuum tube. In order to neutralize the inherent capacity between the grid 11 and the plate 14, and thereby to prevent oscillations, a neutralizing winding 19, electromagnetically coupled to winding 13, and neutralizing condenser 3 are employed in the manner described in the U. S. patents to Hazeltine, Nos. 1,489,228 and 1,533,858.

A second stage of radio-frequency amplification including the vacuum tube 15 neutralized by cooperation of coil 26 and condenser 4, like the first stage, comprises the secondary winding 16 of the last-mentioned radio-frequency transformer tuned by a variable condenser 17 connected between the filament system of the vacuum tube 15 and the grid 18 thereof. The output circuit of this vacuum tube also includes the high-voltage battery B and a primary winding 20 of a second radio-frequency transformer, while the secondary winding 21 of this transformer tuned by a variable condenser 22 is included in the input circuit of a third stage of radio-frequency amplification which includes vacuum tube 23. The inherent capacity effective between the electrodes 24 and 25 is neutralized by a network including the neutralizing condenser 28 and the neutralizing winding 29 as described in the mentioned patents. The output circuit of the vacuum tube 23 includes the primary winding 30 of a third radio-frequency transformer and the high-voltage battery B. The secondary winding 31 of this last mentioned transformer, tuned by a variable condenser 32, is connected in the input circuit of a rectifier 33 which input circuit includes the fixed condenser 2. The rectifier employed may be of the type commonly known in the art as a two-electrode "Fleming" valve, or may consist of an equivalent such as a three-electrode vacuum tube, as shown, having its grid 12 and its plate or anode 35 directly connected together to comprise in effect a single anode.

The three-stage amplifier functions in a manner well-known in the art to amplify the incoming signal intercepted on the antenna 5. The output circuit of the rectifier 33 includes what may be termed a "rejector" circuit for stopping radio-frequency currents which have passed through the rectifier, and consists of a network including a resistance 34 and a bypass condenser 37, connected between the anode 25 and the filament 38 of the rectifier. The output circuit of the rectifier is coupled to the input circuit of an audio-frequency amplifying vacuum tube 39 through an audio-frequency-pass filter including a fixed condenser 40 and an impedance 41 connected between the filament 42 and the grid 43 of this vacuum tube. The output circuit of this amplifier is connected between the filament 42 and plate 44 through the high-voltage battery B and the primary winding 45 of an audio-frequency transformer the secondary winding 46 of which is connected in the input circuit of a second audio-frequency tube 47, while a resistance 48 connected across the winding 46 serves to give the audio amplifier substantially uniform amplification over the desired frequency range. Instead of employing resistance 48, a closed copper band of suitable size may be placed around the transformer winding so as to be electromagnetically coupled thereto. A loud speaker or other reproducing device 50, or if required, a coupling device for a telephone system, is connected in the output circuit of the last audio-frequency amplifying tube 47. It is presumed that adequate precautions against undesired electromagnetic coupling between the various radio-frequency coupling transformers are included in all of the arrangements herein disclosed.

In accordance with one of the main features of my said copending application Serial No. 203,879, means are provided to control automatically the degree of amplification effected in the radio-frequency amplifying stages. These means include a resistance 51, connected between the filament 38 and the anode 35 of the rectifier, through which the pulsating rectified or converted current flows, thereby developing a negative voltage at terminal 52 with respect to the cathode 38. This negative voltage is applied over conductor 36 through the impedance 53 and the secondary winding 7 of the first radio-frequency transformer to grid 11 of the first radio-frequency stage. Impedance 53, together with blocking condenser 54, is effective to filter out and reject any audio-frequency currents which otherwise might be present in the conductor 36.

To complete the description of the system illustrated in Fig. 1 certain design data or constants are given herewith. It should be understood, however, that these, as well as all other constants appearing in the present specification, are mentioned merely by way of example in describing certain specific embodiments which in practice have proved eminently satisfactory, and are not intended to suggest any specific limitations as to the scope of this invention. Accordingly, fixed condenser 2 may be of 0.0005 microfarads; 37 of 0.0001 microfarads; 54 of 0.01 microfarads; 40 of 0.005 microfarads; resistance 51 of 1 megohm; 34 of 1 megohm; and 41 and 53 of 2 megohms each.

In the operation of the receiver shown in Fig.

1, a signal intercepted on the antenna 5 is successively amplified through the neutralized radio-frequency stages indicated by the vacuum tubes 9, 15 and 23. This amplified signal voltage is then rectified by the rectifier 33, and the rectified pulsating current is successively amplified by the audio amplifying stages including vacuum tubes 39 and 47, after which it may be reproduced as sound by the loud speaker 50. When the rectified or converted signal current flowing through the resistance 51 is greater than a predetermined value, there is developed at the terminal 52 sufficient negative biasing voltage which in turn is impressed, through the conductor 36, upon the grid 11 of the vacuum tube 9, to reduce the amplification of this tube. It will be apparent that as the magnitude of the rectified current flowing through resistance 51 decreases, the voltage at terminal 52 becomes less negative, and the negative biasing voltage impressed upon the grid 11 also diminishes so that the vacuum tube 9 effects an increased degree of amplification. In this manner, the radio-frequency voltage applied to the input of the rectifier is maintained at a nearly constant predetermined value, and the volume of the reproduced signal is substantially uniform under all conditions. The degree of volume of the reproduced signal is then determined by adjustment of rheostat 49 which controls the heating current in the filament 42 of the first audio-frequency amplifying tube 39. The neutralization of the grid-plate capacity of the radio-frequency amplifying tubes is particularly valuable in that it allows an increase in the effectiveness of the amplification control, because such neutralization prevents radio-frequency energy from passing through the grid-plate capacity of the tubes. Thus the relay action of the tubes is almost entirely subject to the control by grid bias voltage.

The time required for operation of the control system would ordinarily be determined by the lowest audio-frequency modulation which must be reproduced. Fading, for example, might be considered a form of modulation; the frequency of the rise and fall of signals due to fading being the frequency of modulation. If this frequency of modulation be increased sufficiently, the effect will be audio-frequency modulation. It will thus be seen that if the automatic control attained by the present invention be allowed to respond too quickly, it will tend to smooth out the desired modulation of the signals at the lower audio-frequencies. Hence, a time constant of operation is chosen which will be greater than the period of the audio-frequencies which the system is intended to amplify. This time constant of the control circuit is equal to the product of the series resistance and the shunt capacitance of the grid bias circuit, represented in Fig. 1 by resistance 53 and capacitance 54. However, since the time constant can always be reduced to a value equal to the period of the lowest modulation frequency, it may readily be set to meet the requirements of nearly any special case which may arise. For example, a value of two million ohms resistance and of 0.1 microfarad capacitance gives a time constant of one-fifth of a second, which does not appreciably affect the modulation at frequencies above five cycles. While this constant is less than required from the point of view of satisfactory audio-frequency quality in the reproduction of music, there appears to be no need for more rapid control under the conditions usually encountered. The use in this connection of condensers of large capacitance, such as one-tenth microfarad, likewise introduces another convenience in that the condensers may also serve to by-pass radio-frequencies in order to prevent undesired coupling between the detector circuit and the first radio-frequency amplifying tube because of some impedance common to those two portions of the apparatus.

There are advantages attending the use, in connection with the invention of my said copending application, of the two-electrode rectifier circuit typified by Fig. 1, which may not be apparent from the foregoing discussion. It is impossible to overload this type of rectifier, and the rectified output voltage is directly proportional to the applied alternating signal voltage when this voltage is large, say over two volts. The control system in the circuits of the figures referred to requires a large operating voltage, say ten volts, so that the latter condition of large signal voltage is realized. No such simple relationship is possible in a three-electrode detector whose rectified output never exceeds a limiting upper value, and is never proportional to the applied voltage, except over a very small range of voltages. This distinction will be seen from Fig. 2, where the abscissæ "A. C." represent the alternating signal voltages, and the ordinates "D. C." represent the rectified output voltages. It is well known that the linear curve is much more desirable when minimum distortion of a modulated signal is desired, and it will be observed from Fig. 2 that the preferred type of curve is obtained from the two-electrode rectifier.

The three-electrode detector is useful for relatively small applied voltages, and the rectified output voltage is then approximately proportional to the square of the applied voltage, i. e., to the power associated with the applied voltage. For this reason the rectified voltage increases with the carrier wave modulation. When such a detector is used in the control system, the total power from the radio-frequency amplifier is maintained at a substantially constant level, the amplitude of the carrier wave being decreased in the presence of modulation. It is desirable to maintain the carrier wave at a constant amplitude at the output of the amplifier, and this is accomplished by the two electrode rectifier as shown in Fig. 1. The control system maintains constant the average signal amplitude which is equal to the carrier wave amplitude and independent of the degree of modulation.

It will be observed that in a system employing a two-electrode rectifier such as represented by valve 33 of Fig. 1, the control bias voltage is independent of the B battery voltage.

In the foregoing description, a tuned radio receiver of the neutralized type has been used as an example. It should be pointed out, however, that the present invention may be employed with equal effectiveness in any radio receivers or carrier-current devices in wire-transmission or space-transmission systems. It has been found especially applicable to receivers of the superheterodyne type.

The behavior of the diode detector of Fig. 1 will now be explained in more detail, with reference to Figs. 3 and 4. In Fig. 3, the diode detector 55 comprises an anode 56 and cathode 57. The signal voltage $E_s$ is supplied from the terminals of coil 58, and is applied to the detector through condenser C. This condenser may be called a "blocking condenser" because it prevents any electric charge on the anode 56 discharging through any other path except the high resistance leakage path R. Condenser C has a value such that its impedance to carrier frequency currents is much smaller than that of the tube 55 with R in parallel; but also such that its impedance to modulation-frequency currents is much larger than that of tube 55 with R in parallel. The former condition allows $E_s$ to be applied to the detector terminals without loss; the latter condition allows a rectified voltage $E_a$ across condenser C to fluctuate in accordance with modulation of the signal.

Curve (1) of Fig. 4 shows the relation between instantaneous current $I_i$ and instantaneous voltage $E_i$ at the detector terminals. The curve shown is a 3/2-power curve, which is the theoretical relation of the vacuum tube. This relation is most closely attained in tubes having a unipotential cathode heated by indirect means, but the particular shape of this curve does not materially affect the results described herein. It is only necessary that the detector have practically uni-lateral conductivity.

The following theoretical discussion will serve to establish more definitely the mode of operation of the detector in the presence of a modulated carrier signal.

When there is no signal voltage $E_s$, the anode voltage $E_i$ is held at or near that of the cathode by the leakage path R. Consider a sine-wave signal applied to the detector, of the form $$E_s = E_o \sin \omega_s t$$

where $E_o$ represents the maximum voltage of the wave; $\omega$ is $2\pi$ times the frequency of the signal wave; and $t$ represents time.

The first cycle produces a voltage swing $E_i$ shown by curve (2a). During the positive half of the cycle, the current $I_i$ reaches a high value as shown by curve (2b). The condenser C is thereby charged negatively at an average rate indicated by the shaded area under curve (2b). This shaded area is equal to the area within curve (2b). As the condenser receives an increasing negative charge, the condenser bias voltage $E_a$ grows in magnitude, and the positive swing of $E_i$ is decreased both in amplitude and duration, as indicated by curve (3a). The charging rate is thereby rapidly decreased, as indicated by curve (3b). The current curves (2b) and (3b) are drawn on a time base as indicated by the broken line arcs extending from the corresponding voltage waves. The relation between the bias voltage $E_a$ and the average rate of charge $I_a$ is shown by curve (4). The charging rate $I_a$ in curve (4) obviously approaches zero as the bias voltage $E_a$ approaches the signal peak voltage $E_o$, because then there would be no positive swing of the anode voltage $E_i$.

During this process, the average rate of discharge $I_d$, through R, is steadily increased as indicated by curve (5) and the equation $$I_d = E_a / R$$

When the charging rate $I_a$ and the discharging rate $I_d$ reach equality, the bias voltage on condenser C is increased no further. This final value of $E_a$ is indicated by the intersection of curves (4) and (5).

It is to be noted that the final value of $E_a$ is nearly as great as the signal peak voltage $E_o$. This results from the high value of R and the resulting small slope of curve (5) in Fig. 4.

Greater values of R cause $E_a$ to approach $E_o$ more closely, but other factors make it necessary to keep the value of R within a reasonable upper limit. One of these factors is the requirement, stated above that the impedance of condenser C to modulation frequency currents must be much greater than that of the tube with R in parallel.

It is apparent that Fig. 4 illustrates the determination of the rectified voltage $E_a$ for only one value of signal peak voltage $E_o$. A similar determination can be made either graphically or experimentally for various signal voltages, and the rectified direct current output plotted against the alternating current signal as in Fig. 2. This determination has been made both graphically and experimentally for a number of different practical cases, and the results can be summarized as follows: When the signal voltage is relatively large, the rectified voltage $E_a$ is only slightly less than the signal peak voltage $E_o$, as in the example of Fig. 4. This near-proportionality between the rectified output and the signal, is a linear relationship, and this is a kind of "linear detection". This mode of operation may also be called "peak detection", in order to distinguish from other types of linear detection. Peak detection, it is noted, does not require a linear curve of instantaneous current and voltage, since curve (1) of Fig. 4 is not linear, but is a 3/2-power. The requirements for peak detection are quite different, as will be outlined below in more detail.

The first prerequisite of peak detection is a rectifier whose conductance in one direction is very much smaller than that in the other direction. This is very well satisfied by the diode vacuum tube, whose conductance in the reverse direction is zero, except for capacity currents. This is shown by curve (1) in Fig. 4.

The second prerequisite of peak detection is a leakage path or load whose conductance is very much smaller than that of the rectifier in the direction of greater conductance. This is shown by curve (5) as compared with curve (1) in Fig. 4. The extent to which this relationship is satisfied determines the degree to which the rectified voltage $E_a$ approaches the peak voltage $E_o$. It is apparent that, in the limiting case of zero leakage current, curve (5) would coincide with the horizontal axis and $E_a$ would equal $E_o$. It is also apparent that condenser C must be made sufficiently small to prevent additional audio frequency currents through this condenser, if the detector is to follow the envelope of a signal modulated at audio frequencies.

The third prerequisite of linear detection is a signal voltage sufficiently great to extend beyond the transition region of the rectifier curve (1), which is a small region (at the origin of Fig. 4) where the rectifier conductance is not sufficiently different in the two directions. Since Fig. 4 is intended to illustrate the behavior with high signal voltages, this transition region is drawn so small as not to be apparent. Its importance depends not only on the type of rectifier, but also on the magnitude of the leakage of load conductance.

The transition region is very small and relatively unimportant in the case of diodes having indirectly heated equipotential cathodes, but is somewhat greater in the case of diodes having filament cathodes directly heated by direct current.

The following rule, which has been derived on logical assumptions, expresses approximately the minimum value of peak signal voltage required in most cases to extend beyond the transition region of curve (1):

$$E_o = \frac{2\left(\frac{dI_i}{dE_i}+\frac{1}{R}\right)}{\frac{d^2I_i}{dE_i^2}}.$$

The first and second derivatives in the equation are those of curve (1) at its intersection with curve (5). (This intersection need not occur exactly at the origin, and frequently does not in practical cases.) The term 1/R is, of course, the conductance of the leakage path or load. This value of $E_o$ is smaller when R is increased or when the curvature term (denominator) is increased. It is not within the scope of this application to describe the derivation of this rule.

The initial value of signal voltage required to give substantially linear detection in practical circuits ranges from 0.1 to 1 volt, and may be obtained from the above rule or by experiment. In the case of a modulated carrier, the carrier voltage must be much greater than this initial voltage because the signal voltage is at times much smaller than the average or carrier voltage. For example, the value of 2 volts mentioned above was the computed carrier voltage required to give a signal always greater than 0.5 volt when modulated up to 75%.

When the above prerequisites of peak detection are met in practice, as in the automatic volume control receiver of Fig. 1, the performance of the detector is ideal. The rectified voltage closely follows the modulation envelope of the signal voltage, and therefore the modulation wave form is not distorted in the process of rectification. (The contrary is true of the common square-law detectors, and of any ordinary detectors when operated at saturation or overload levels.) The diode detector operated to give peak detection does not have any important overloading effects because the peaks of the waves never become greatly positive; in fact, its operation is somewhat better at higher signal voltages, within reasonable limits.

Fig. 5 is the circuit diagram of a rectifying and indicating system which takes advantage of peak detection and other refinements and which has been found eminently satisfactory for many purposes. It is used principally to measure sinusoidal alternating voltages of commercial, audio or radio frequencies. Electrical constants will be given which have been employed in practice, but these may vary within wide limits without departing from the inherent improvements.

Vacuum tubes 60 and 63 may be of the 171A type having 20-ohm filaments and the triode structure of elements. Tube 60 is operated as a diode peak detector. The grid is tied to the positive filament terminal, and partly neutralizes the space charge around the filament, without serving any other function. Tube 63 is a direct-current amplifier in which the usual functions of the grid and plate are interchanged, the plate serving as control electrode and the grid as output electrode.

The unknown sinusoidal voltage to be measured is applied to the input terminals. The rectifier is thrown in operation by switch 59, and the unknown voltage is applied to the rectifier through condenser C (0.5 mfd.) which has a negligible impedance at frequencies of voltages to be measured, but prevents the flow of direct-current between input terminals and rectifier. Resistor R (5 megohms) is connected between the anode and the positive filament terminal, and serves to supply about one microampere initial anode current for tube 60. The rectifier current flows through R and builds up at point 52 a rectified voltage nearly equal to the peak of the unknown voltage.

The rectified voltage is applied to resistor 61 (1 megohm) and condenser 62 (0.1 mfd.) which filter out the alternating current component and supply a steady negative rectified voltage to the amplifier tube 63. Hence, this arrangement may properly be called a fluctuation-rejector; it tends to prevent over-loading of amplifier 63 by preventing the alternating current component of the rectified voltage from being impressed thereon.

Battery 64 (9 volts) supplies the space current of tube 63. Resistor 78 (22,000 ohms) is connected in series to make the total output resistance of tube 63 more nearly uniform thereby decreasing any distortion in the amplifying process. The microammeter 70 (100 microamperes full scale) carries the output current (about 400 microamperes) together with a nearly equal balancing current through resistor 79 (6200 ohms). Rheostat 77 (2500 ohms) is permanently adjusted to correct the slope of the calibration curve, as will be described below in more detail, but does not affect the current balance existing when switch 59 is disconnected. The meter is protected by switch 76 when not in use. The balancing current is controlled by voltage divider 75 (400 ohms).

The filaments are heated by battery 68 (6 volts). The rheostat 67 (2 ohms) is so adjusted that voltmeter 69 reads 5.5 volts. The filament voltages are further decreased by resistors 65 and 66 (each 6 ohms). The latter resistor 66 is so connected that the control electrode (plate) of tube 63 receives a slight initial negative bias through tube 60 and resistor 61. Resistors 71, 72, 73 and 74 (respectively 300, 210, 30 and 10 ohms) serve to divide the voltmeter voltage in required parts for output and balancing circuits. The filament battery therefore serves also to furnish the grid bias voltage and balancing current.

Because of the high resistance external circuits of tubes 60 and 63, the performance varies very little with tube variations, and battery voltages need not be maintained precisely constant.

The essential operation of the vacuum tube voltmeter of Fig. 5 will be described with reference to the curves of Fig. 6, which show the relations between the input alternating-current voltage and the amplified-rectified current change in meter 70. The full scale of this meter (100 microamperes) is not shown because the curves are simply linear at higher values.

As originally constructed, rheostat 77 was absent, and the initial reading of meter 70 was adjusted to zero by voltage divider 75. The calibration curves then secured were like the dot-dash curve (a), in that the meter readings did not correspond exactly to input alternating-current voltages. It was noted that two corrections were required, one for the curvature near the origin, and another for the slope of the linear part of the curve.

In a subsequent design, correction was made for the curvature at the origin by supplying an excess balancing current of 2 microamperes in meter 70, and the slope was decreased to the correct value by the permanently adjusted rheostat 77. The rheostat 77 is therefore a sensitivity adjusting means. The final calibration curve (b), drawn in a solid line, then shows an exact correspondence between meter current and input voltage, except at voltages below 5% of full scale. The result is a tube voltmeter which requires no reference to a calibration curve and is very accurate for measuring sinusoidal voltages from 0.5 to 10 volts (root-mean-square values). The input circuit has such a high impedance that the source of the unknown voltage may have as high as 3000 ohms impedance without causing any important error of calibration.

Because of the low filament temperatures and non-critical circuit values, there is only a minute required to reach temperature equilibrium. Thereafter, no readjustment is required during hours of use. An excessive overload does not injure the sensitive meter 70, because the plate current of tube 63 cannot fall below zero and therefore the net meter current on overload cannot exceed the balancing current, which is only about four times full scale deflection. Also the meter is not subjected to mechanical shock on overload because of the slight time lag in charging condensers C and 62 up to the rectified voltage.

Fig. 7 is a partial circuit diagram of a radio receiver employing peak detection but differing somewhat from Fig. 1. Individual batteries are shown in place of the more complex alternating current rectifiers, ripple filters and voltage dividers; it is understood that either may be employed with equal effectiveness in such circuits. Tube 80 is a screen-grid tube in the last stage of a multi-stage radio-frequency amplifier. Tube 81 is a triode with grid and plate tied together, so as to be equivalent to a diode, and is used to obtain peak detection. Tubes 82 and 83 are triodes used in the first two stages of the audio-frequency amplifier. Since the diode detector does not also amplify, it is necessary to employ one more audio-frequency stage than is customary with triode detectors. The tubes shown all have indirectly heated cathodes, the heating circuits being omitted from the diagram. Like Fig. 1, this receiver also has automatic volume control.

The voltage for the screen-grid of tube 80 is supplied by battery 98. The plate circuit includes battery 118 and auto-transformer 84. The transformer is broadly resonant over the broadcast band, and the primary is shunted by resistor 99 to make the response more nearly uniform.

The rectifier 81 receives the secondary voltage of transformer 84 through condenser C (50μμf.). Resistor R (0.2 megohm) is the leakage path between anode and cathode. Resistor 87 (0.25 megohm) and condenser 88 (250μμf.) serve to reject the radio-frequency component, but to pass the audio-frequency and direct current components of the rectified voltage to the grid of tube 82. The grid, or input, circuit of tube 82 operates as a voltage responsive device having a very high input impedance and little or no input current flow.

An automatic volume control arrangement supplies automatic grid bias voltages to the various tubes as follows: An initial negative voltage is applied to the entire detector circuit by battery 85 (3 volts). Added to this bias is a second negative component due to the rectified voltage across R. The second component serves to reduce the gain of certain tubes in the presence of a strong signal. The total bias voltage is applied to the grid of tube 82 through the radio-frequency rejector circuit 87, 88, and then also to the grids of the radio-frequency tubes preceding tube 80, through the audio-frequency rejector circuit including resistor 89 (0.5 megohm) and condenser 90 (0.01 to 0.1 mfd.). Since the radio-frequency tube 80 is required to maintain a fairly high gain, it is supplied with a smaller bias from a center tap on R, through the radio-frequency and audio-frequency rejector circuit including resistor 86 (0.5 megohm) and condenser 97 (0.01 to 0.1 mfd.).

The first two audio-frequency stages include tubes 82 and 83. Condenser 91 serves to suppress any residual radio-frequency fluctuations accompanying the amplified output of the detector. Battery 93 supplies the space current of tube 82, and battery 96 the grid bias of tube 83. Condenser 94 and resistors 92 and 95 are a resistance coupling network between tubes 82 and 83. The latter resistor 95 has a variable tap for use as a volume level control, in conjunction with the automatic volume control.

It should be understood that the element values expressed in connection with Fig. 7 and with succeeding figures are given merely to indicate values which will give good results; and should not be construed as limitations upon the invention.

Fig. 8 is a partial circuit diagram of another receiver employing both peak detection and automatic volume control. The tubes have indirectly heated cathodes. Screen-grid tube 100 is in the last radio-frequency amplifier stage. Tube 101 is a triode used as a diode peak detector, or rectifier, having two terminals, namely the anode and the cathode, the grid being used as anode, and the plate being tied to cathode and used as an electrostatic shield against any electrostatic coupling which would otherwise exist between at least one of the inner electrodes and other parts of the circuit. Tube 102 is in the first audio-frequency amplifier stage.

Tube 100 has a screen voltage supplied by battery 103 and plate voltage supplied by battery 104. An inductive radio-frequency transformer 105 couples the radio-frequency amplifier to the detector, and is designed to give nearly uniform response over the broadcast band.

The detector circuit of Fig. 8 is an improvement over Fig. 7 in that the inductive transformer 105 permits the condenser C to be inserted in the cathode lead instead of in the anode lead of the diode detector. The condenser C is connected in series between the cathode of the rectifier and the transformer 105 which is a source of alternating voltage for the rectifier. The required radio-frequency voltage is thereby impressed between anode and cathode, but radio-frequency currents are confined to the detector tube and condenser C, and are nearly absent from all other parts of the detector circuit. Condenser C (100μμf.) and resistor R (50,000 ohms) serve the same purposes described above. Resistor R is a leakage path across the rectifier, this leakage path having a high and substantially uniform impedance to modulation frequency and direct current and being connected between the lower end of the secondary winding of transformer 105 and ground, through battery 110. The somewhat lower value of R as compared with that in the preceding circuits, serves the added purpose of increasing the anode current and thereby making the response of transformer 105 more uniform over the broadcast band. There is not associated with the rectifier any leakage path of lower resistance than R.

In the arrangement of Fig. 8, the cathode terminal of the diode detector is required to be grounded (which is accomplished through battery 110). The condenser C is connected between the detector cathode and the lower end of the secondary coil of transformer 105. Since this ungrounded secondary coil is essentially an inductance, its resistance is low in comparison with that of R. The alternating voltage to be rectified is induced in this secondary coil from the primary coil of transformer 105. The upper end of the secondary coil is connected to the other terminal (the anode) of the rectifier.

As in the case of Fig. 7, initial and rectified grid bias components are furnished to the radio-frequency tubes by battery 110 (3 volts) and detector 101. The grid bias for the radio-frequency tubes preceding tube 100 is conducted through the audio-frequency and radio-frequency rejector circuit including resistor 106 (0.5 megohm) and condenser 107 (0.01 to 0.1 mfd.). A smaller grid bias is supplied to tube 100 from a center tap on R, through the audio-frequency and radio-frequency rejector circuit including resistor 108 (0.5 megohm) and condenser 109 (0.01 to 0.1 mfd.).

The audio-frequency amplifier is a voltage-responsive device having in its input circuit a voltage divider 116. The impedance of the amplifier, including the voltage divider, is much higher than that of the leakage path R. The audio-frequency amplifier can be connected either to the radio detector 101 or to the phonograph pick-up 114, by throwing switch 113 to (R$_a$) or (P$_h$) respectively. In the former case, the audio-frequency output of the detector is passed through the added radio-frequency, or carrier-frequency, ejector circuit including resistor 111 (0.25 megohm) and condenser 112 (100$\mu\mu$f.), in order to completely remove radio-frequency fluctuations. This latter circuit is also a direct-current rejector circuit because of the condenser 115. The pure audio-frequency output is then applied through condenser 115 (0.005 mfd.) to the voltage divider 116 (1 megohm). The variable tap on 116 to the grid of the audio amplifier serves to control the volume level of the audio-frequency amplifier output, when used with either radio or phonograph excitation. The battery 117 supplies the required grid bias to audio-frequency tube 102. The remaining side, or terminal, namely the cathode, of the input circuit of the audio amplifier is required to be grounded, as shown. Also, the grid of the audio amplifier is connected (through elements 111, 115 and 116) to the junction of condenser C and the secondary coil of transformer 105. Hence, the audio amplifier, or voltage-responsive device, is connected in parallel with condenser C and resistance R.

Figure 9:
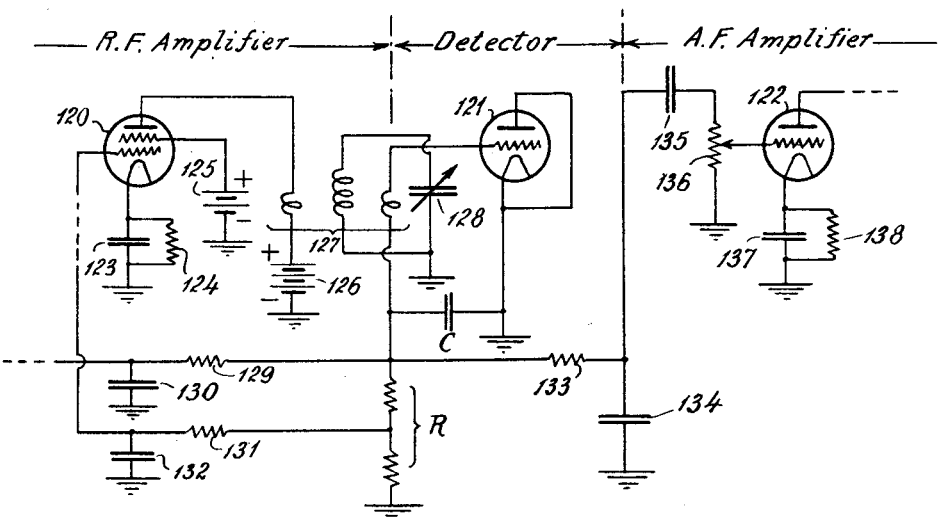
Fig. 9 is a partial circuit diagram of a radio receiver having a diode detector receiving the output of a tuned radio-frequency amplifier stage.

Fig. 9 is a partial circuit diagram of a radio receiver employing peak detection and automatic volume control, in which the detector circuit arrangement differs somewhat from the previously described arrangements. The tubes have indirectly heated cathodes. Screen-grid tube 120 is in the last radio-frequency amplifier stage. Tube 121 is a triode used as a diode peak detector, the grid being used as anode, and the plate being tied to cathode and to ground and used as an electrostatic shield against any electrostatic coupling which would otherwise exist between at least one of the inner electrodes and other parts of the circuit. Tube 122 is in the first audio-frequency amplifier stage.

Tube 120 has a screen voltage supplied by battery 125 and plate voltage supplied by battery 126. A tuned inductive radio-frequency transformer 127 couples the radio-frequency amplifier to the detector. The primary (left-hand) coil of this transformer is in the output circuit of tube 120. The secondary (middle) coil is tuned to resonance by variable condenser 128. In order to achieve certain advantages, the detector is not connected to the secondary coil, but to a tertiary (right-hand) coil coupled to the secondary.

The tertiary coil conveys to the detector only about one-third of the entire secondary voltage, thereby preventing excessive damping of the tuned circuit by the detector load conductance. The use of the separate tertiary coil also allows connecting the condenser C in the cathode return lead of the detector circuit (as in Fig. 8). Condenser C (250$\mu\mu$f.) and resistor R (0.1 megohm) serve the same purposes described above.

In Fig. 9, the radio-frequency tubes are supplied with initial grid bias voltages in a customary manner, indicated for tube 120 by series resistance 124 and radio-frequency by-pass condenser 123. An additional automatic grid bias is supplied from the rectifier voltage of the detector. The radio-frequency tubes preceding tube 120 receive the entire automatic bias through the radio-frequency and audio-frequency rejector circuit including resistor 129 (0.5 megohm) and condenser 130 (0.01 to 0.1 mfd.). Tube 120 receives a smaller additional bias through the radio-frequency and audio-frequency rejector circuit including resistance 131 (0.5 megohm) and condenser 132 (0.01 to 0.1 mfd.).

The audio-frequency output of the detector is passed to the detector output circuit through the radio-frequency rejector circuit including resistor 133 (0.25 megohm) and condenser 134 (250$\mu\mu$f.), in order to completely remove radio-frequency fluctuations. The pure audio-frequency output is then applied through condenser 135 (0.01 mfd.) to the voltage divider 136 (1 megohm). The variable tap on 136 serves to control the volume level of the audio-frequency amplifier output. The first audio-frequency tube 122 has any conventional grid bias provision, such as a series resistance 138 and an audio-frequency by-pass condenser 137.

The radio receivers of Figs. 1, 7, 8 and 9 have proven eminently satisfactory, especially with reference to the absence of distortion in the process of detection. The peak detection employed provides a rectified output which follows closely the envelope of the modulated radio-frequency signal. The achievement of peak detection is aided by the automatic volume control which maintains the detector voltage within the proper operating range, regardless of the applied signal strength.

In addition to the above improvements, a further refinement has been devised which is a desirable modification for peak detection circuits. This refinement is directed to a filtering arrangement located at the output of the tube; and is especially useful in laboratory studies, as it enables the audio-frequency behavior of a peak detector to be determined precisely by measurements made with direct-current meters and without audio-frequency modulation of the radio-frequency signal. This refinement will be explained with reference to Fig. 10.

Fig. 10a shows the detector circuit of Figs. 8 and 9, reduced to its essential elements, namely: a diode rectifier; a radio-frequency input coil; the condenser C and the resistor R. The radio-frequency currents flow through condenser C, but the audio-frequency and direct-current rectified components flow through the resistor R. The direct-current load and the audio-frequency load on the detector are therefore effectively the same, and are equal to the resistance R. This is a desirable condition, because all the useful modulation of signals occurs in the audio-frequency range, and the rectified automatic bias voltages lie in the sub-audio-frequency or direct-current range. This rectifier circuit behaves alike in these frequency ranges. The audio-frequency and direct-current output components are not separated, however, and exist between the terminal represented by the arrow, and ground. The separation of these components requires additional circuit elements which generally destroy this condition of identity between direct-current load and audio-frequency load.

The structure of Fig. 10b has, in addition to the elements of Fig. 10a, a low-pass filter in which $$R^2 = L/C$$
$$fc^2 = 1/\pi^2 LC$$

The cut-off frequency $fc$ is located slightly above the audio-frequency range but much below the radio-frequency range of the signals to be received. The addition of this filter (which may include several sections like the one shown) further reduces radio-frequency fluctuations in the direct-current and audio-frequency output, but has a negligible effect on the direct-current or audio-frequency load impedance.

The filters in the succeeding Figs. 10c to 10h possess advantages over the filters of Figs. 10a and 10b in that they enable the direct-current and audio-frequency components of the rectified current to be separated. While the filter of Fig. 10b is shown nowhere else in Fig. 10, it is understood to be equally applicable to the other circuits of Fig. 10.

Fig. 10c shows, in place of the simple resistor R in Fig. 10a, a network R, R, L', C' which is known to have an effective resistance equal to R at all frequencies when the equation of condition is satisfied, namely:

$$R^2 = L'/C'$$

This network has the ability to separate rapid fluctuations of the audio-frequency component from the relatively very slow fluctuations of the direct-current component, the dividing frequency being the resonant frequency of the reactive elements L' and C'. The audio-frequency component is shown as delivered from the secondary of an inductive transformer whose turns ratio, $N_1:N_2$, may have any desired value. The audio-frequency component exists between the terminals marked AF; and the direct-current potential exists between ground and the terminal marked DC.

Fig. 10d is similar to Fig. 10c except that the resistance R in parallel with the primary inductance is replaced by a resistance R $(N_2/N_1)^2$ across the secondary coil, the result being the same. A variable tap on this resistance may be used as a volume level control if desired, without any detrimental effect.

Fig. 10e is similar to Fig. 10c, except that the resistance R across the primary L' is replaced by a transmission line of proper impedance across the secondary coil.

Fig. 10f is an example using a different type of constant resistance network R, R, L', C'. The direct-current component flows in one shunt path R, C' and the alternating-current component in the other path R, L'.

Fig. 10g is an inverted form of Fig. 10f, and accomplishes the same result. In addition, a variable tap audio-frequency volume level control is indicated to be used if desired.

Fig. 10h employs a third form of constant resistance network R, L', L', C', C'. It has points of similarity with both Figs. 10f and 10g, and accomplishes the same result.

The direct-current output components from all the above circuits can be employed to advantage as automatic grid bias for automatic volume control, after the manner of Figs. 1, 7, 8 and 9.

The same equation of condition stated above holds for all cases of Figs. 10c to 10h. This utilization of constant resistance networks is not only useful in diode rectifier circuits, but is equally applicable and often very useful in the output circuits or other rectifier circuits, and of amplifier circuits. In all such cases there is the same advantage of uniform behavior toward both direct-current and audio-frequency components of the rectifier or amplifier output.

Many other applications of the improvements outlined above will be apparent but need not be discussed herein. They have also been found equally useful in superheterodyne receivers and in other special examples. It is obvious that the radio-frequency amplifiers referred to in the above cases can be replaced by amplifier arrangements of the superheterodyne or other special types.

What is claimed is:

1. A rectifying system comprising, in combination, a rectifier having two terminals, a source of carrier-frequency current modulated at modulation frequencies lower than said carrier frequency, a condenser connected in series with said source and said rectifier, a leakage path across said rectifier, and a voltage-responsive device having an impedance much higher than that of said leakage path, connected in parallel with said condenser, said path having a high and substantially uniform impedance to modulation frequency and direct currents.

2. A rectifying system comprising, in combination, a rectifier having two terminals, a source of carrier-frequency current modulated at modulation frequencies lower than said carrier frequency, a capacity element connected in series with said source and said rectifier, and a leakage element and a voltage-responsive element having an impedance much higher than that of said leakage element, connected in parallel with said condenser, the three parallel elements having a low impedance to carrier-frequency current and a high and substantially uniform impedance to modulation-frequency and direct currents.

3. A rectifying system comprising, in combination, a diode rectifier having two terminals, one of which is required to be grounded, a low-resistance ungrounded coil in which is induced an alternating voltage to be rectified, a condenser connected between one end of said coil and said grounded terminal, a connection between the other end of said coil and the other said terminal, a high-resistance leakage path across said condenser, a voltage responsive device having an impedance much higher than that of said leakage path and having one side which is required to be grounded, and a connection between the other side of said device and the junction of said coil with said condenser, whereby a rectified voltage is developed across said condenser and said device substantially free of fluctuations at the frequency of said alternating voltage.

4. The method of utilizing a space-discharge triode in a diode rectifier circuit, said triode having an outer electrode and two inner electrodes, which comprises operatively connecting said two inner electrodes in said circuit and connecting said outer electrode to ground, whereby the outer electrode is caused to shield said inner electrodes from the surrounding space.

5. A rectifying system comprising, in combination, a source of carrier-frequency voltage modulated at an audio-frequency, a thermionic diode rectifier, a condenser having low reactance at said carrier frequency and high reactance at said audio frequency, a series circuit including said source, said condenser and said rectifier, a high-resistance leakage path, without any leakage path of lower resistance, across said rectifier, an output circuit coupled to said rectifier, and a carrier-frequency rejector network interposed between said rectifier and said output circuit, whereby the latter is caused to function free of interference at said carrier frequency.

6. A rectifying system comprising, in combination, a source of carrier-frequency voltage modulated at an audio frequency, a thermionic diode rectifier, a condenser having low reactance at said carrier frequency and high reactance at said audio frequency, a series circuit including said source, said condenser and said rectifier, a high-resistance leakage path, without any leakage path of lower resistance, across said rectifier, an output circuit coupled to said rectifier, and carrier-frequency and direct-current rejector networks interposed between said rectifier and said output circuit whereby the latter is caused to function free of interference from carrier-frequency or direct-current components.

7. The method of utilizing in a diode rectifier circuit a space discharge tube having more than two electrodes, which comprises operatively connecting two of the inner electrodes in said circuit, and connecting an electrode outside of both said inner electrodes to ground for shielding against undesired electrostatic coupling which would otherwise exist between at least one of said inner electrodes and other parts of said circuit.

8. A rectifying system comprising, in combination, a rectifier having two terminals, a source of carrier-frequency current modulated at modulation frequencies lower than said carrier frequency, a capacity element connected in series with said source and said rectifier, and a leakage element and a voltage-responsive element having an impedance much higher than that of said leakage element, connected effectively in parallel with said condenser, the three parallel elements having a low impedance to carrier-frequency current and a high and substantially uniform impedance to modulation frequency and direct currents, and a carrier-frequency rejector network interposed between said rectifier and said voltage-responsive element, whereby said voltage-responsive element is caused to function free of interference at said carrier frequency.

HAROLD A. WHEELER.